(12) United States Patent
Luthra et al.

(10) Patent No.: US 12,362,988 B2
(45) Date of Patent: Jul. 15, 2025

(54) APPLICATION SOFTWARE HEALING SYSTEM AND METHOD OF OPERATION

(71) Applicant: Rakuten Mobile, Inc., Tokyo (JP)

(72) Inventors: Mohit Luthra, Singapore (SG); Partha Roy, Karnataka (IN); Amber Jain, Madhya Pradesh (IN); Vijay Kumar, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/921,112

(22) PCT Filed: May 3, 2022

(86) PCT No.: PCT/US2022/027363
§ 371 (c)(1),
(2) Date: Oct. 25, 2022

(87) PCT Pub. No.: WO2023/214962
PCT Pub. Date: Nov. 9, 2023

(65) Prior Publication Data
US 2024/0223438 A1 Jul. 4, 2024

(51) Int. Cl.
*H04L 41/0659* (2022.01)
*H04L 41/0604* (2022.01)
*H04L 41/0631* (2022.01)

(52) U.S. Cl.
CPC ...... *H04L 41/0661* (2023.05); *H04L 41/0604* (2013.01); *H04L 41/0631* (2013.01)

(58) Field of Classification Search
CPC ............. H04L 41/0661; H04L 41/0604; H04L 41/0631
See application file for complete search history.

(56) References Cited

U.S. PATENT DOCUMENTS

| | | | |
|---|---|---|---|
| 2020/0007413 A1* | 1/2020 | Kerpez | H04L 41/40 |
| 2020/0053834 A1* | 2/2020 | Dahan | H04L 41/0816 |
| 2021/0377116 A1* | 12/2021 | Yeh | H04W 24/10 |
| 2021/0409962 A1* | 12/2021 | Kwok | H04W 16/14 |
| 2024/0004734 A1* | 1/2024 | Rahman | G06F 9/542 |

* cited by examiner

*Primary Examiner* — Shean Tokuta
*Assistant Examiner* — Juan C Turriate Gastulo
(74) *Attorney, Agent, or Firm* — HAUPTMAN HAM, LLP

(57) ABSTRACT

A system includes processing circuitry; and a memory connected to the processing circuitry, wherein the memory is configured to store executable instructions that, when executed by the processing circuitry, facilitate performance of operations, including receive a virtualized radio access network (vRAN) policy that includes an event to filter for and response to the event; obtain event messages from a data source, wherein each event message is generated by one or more state changes within a vRAN; filter each event message based on the vRAN policy; enrich filtered event message with information from an inventory; and trigger an action corresponding to the response in the vRAN policy.

20 Claims, 12 Drawing Sheets

APPLICATION SOFTWARE HEALING SYSTEM AND METHOD OF OPERATION

RELATED APPLICATIONS

The present application is a National Phase of International Application No. PCT/US2022/027363, filed May 3, 2022.

BACKGROUND

Event-driven architecture (EDA) is a software architecture promoting the production, detection, consumption of, and reaction to events. An event is a change in state, or an annotated label based on an entity's log output in a system. For example, when a consumer purchases an online product, the product's state changes from "for sale" to "sold". A seller's system architecture treats this state change as an event whose occurrence is made known to other applications within the architecture. What is produced, published, propagated, detected, or consumed is a message called the event notification, and not the event, which is the state change that triggered the message emission. Events occur and event messages are generated and propagated to report the event that occurred. Nevertheless, the term event is often used metonymically to denote the notification event message. The EDA is often designed atop message-driven architectures, where such a communication pattern includes one of the inputs to be text-based (e.g., the message) to differentiate how each communication is handled.

Event correlation is a technique for making sense of many events and pinpointing the few events that are of interest in the large number of events. This is accomplished by looking for and analyzing relationships between events.

BRIEF DESCRIPTION OF THE DRAWINGS

Aspects of the present disclosure are best understood from the following detailed description read with the accompanying FIGS. In accordance with the standard practice in the industry, various features are not drawn to scale. The dimensions of the various features are arbitrarily increased or reduced for clarity of discussion.

DETAILED DESCRIPTION

Figure 1:
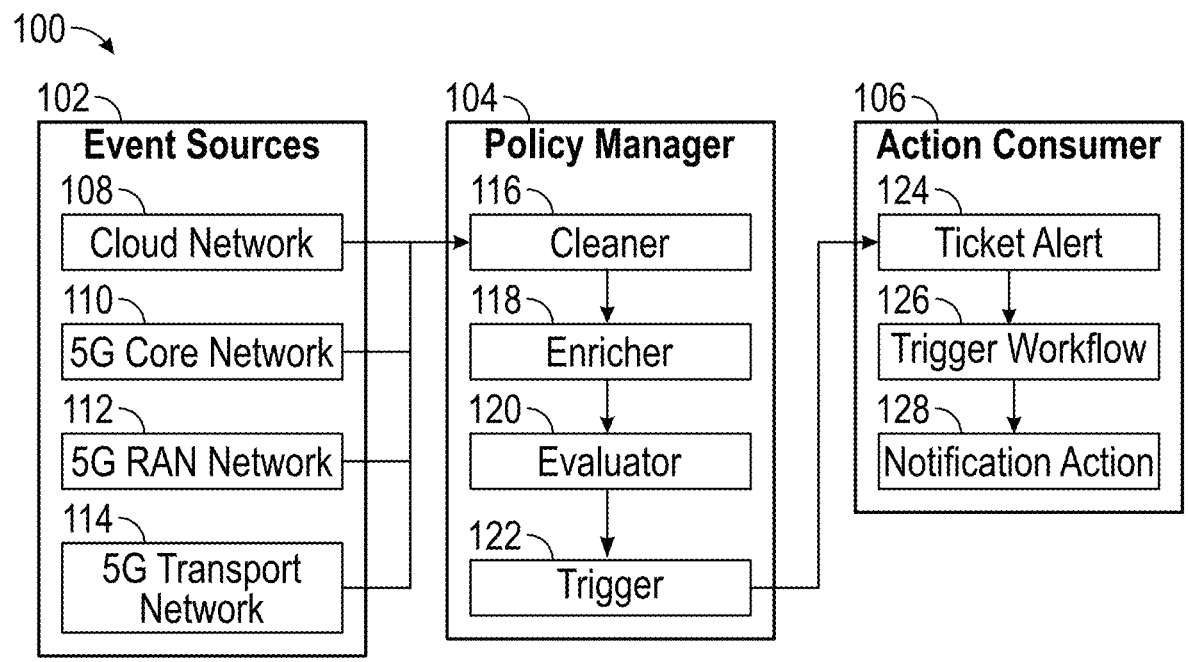
FIG. 1 is a block diagram of a correlation and policy engine (CPE), in accordance with some embodiments.

The following disclosure includes many different embodiments, or examples, for implementing different features of the subject matter. Specific examples of components, values, operations, materials, arrangements, or the like, are described below to simplify the present disclosure. These are, of course, examples and are not intended to limit. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to contact directly. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are usable herein for ease of description to describe one element or feature's relationship to another element or feature as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors usable herein likewise are interpreted accordingly.

An EDA architectural pattern is applied by the design and implementation of applications and systems that transmit event messages among loosely coupled software components and services. An event-driven system typically consists of event emitters (agents, data sources), event consumers (sinks), and event channels (the medium the event messages travel from emitter to consumer). Event emitters detect, gather, and transfer event messages. An event emitter does not know the consumers of the event messages, the event emitter does not even know whether an event consumer exists, and in the event the consumer exists, the event emitter does not know how the event message is used or further processed. Event consumers apply a reaction as soon as an event message is presented. The reaction is or is not completely provided by the event consumer. For example, the event consumer filters the event message frame while the event policy executes and produces transformation and forwards the event message frame to another component or the event consumer supplies a self-contained reaction to such event message frame. Event channels are conduits in which event message frames are transmitted from event emitters to event consumers. In some embodiments, event consumers become event emitters after receiving event message frame and then forwarding the event message frame to other event consumers. The configuration of the correct distribution of event message frames is present within the event channel. The physical implementation of event channels is based on components, such as message-oriented middleware or point-to-point communication, which might rely on a more appropriate transactional executive framework (such as a configuration file that establishes the event channel).

A correlation and policy engine (CPE) is a software application that programmatically understands relationships. CPEs are configured to be used in system management tools to aggregate, normalize, and analyze event data. Event correlation is a technique for making sense of many events and pinpointing the few events that are important in a mass of information. This is accomplished by looking for and analyzing relationships between events. Further, a CPE is a program or process that receives machine-readable policies and applies them to a particular problem domain to constrain the behavior of network resources.

In other approaches, the CPE has tightly bound capabilities that limits the CPE. For example, multiple use-cases used by tightly bound systems, include: (1) a change management system; (2) a root cause analysis engine (performed in real time), (3) an anomaly detection model engine (performed in real time), (4) an AI model performance engine (performed in real time), (5) a performance analysis engine, (6) a security analytics engine, (7) an on-the-fly policy load/change engine.

Change management systems are an information technology (IT) service management discipline. The objective of change management is to ensure that standardized methods and procedures are used for efficient and prompt handling of all changes to control IT infrastructure, to minimize the number and impact of any related incidents upon service. Changes in the IT infrastructure arise reactively in response to problems or externally imposed requirements, e.g., legislative changes, or proactively from seeking improved efficiency and effectiveness or to enable or reflect business initiatives, or from programs, projects, or service improvement initiatives. Change management ensures standardized methods, processes and procedures which are used for all changes, facilitate efficient and prompt handling of all changes, and maintain the proper balance between the need for change and the potential detrimental impact of changes.

A root cause analysis engine is an algorithm developed to provide an automated version of root cause analysis, the method of problem solving that tries to identify the root causes of faults or problems. The algorithm is configured to be used for inaccurate or inconsistent data, incomplete data, large amounts of data, small datasets, and complex problems such as multi-modal failures or with more than one solution.

In data analysis, anomaly detection (further known as outlier detection) is the identification of rare items, events or observations which raise suspicions by differing significantly from most of the data. Typically, the anomalous items translate to a problem. Anomalies are further referred to as outliers, novelties, noise, deviations, and exceptions. In the context of abuse and network intrusion detection, the interesting objects are often not rare objects, but unexpected bursts in activity. This pattern does not adhere to the common statistical definition of an outlier as a rare object, and many outlier detection methods (unsupervised methods) fail on such data, unless it has been aggregated appropriately.

AI model performance engines monitor AI models for changes such as model degradation, data drift, and concept drift, to ensure the AI model is maintaining an acceptable level of performance.

A performance analysis engine identifies whether service performance targets are being achieved, and where relevant, to provide verifiable evidence. Alerts when service performance is degrading, especially when service performance falls below targets; provides information that helps analyze situations, identify locations, scales, and variances of performance problems, and supports information for proposed remedial action; and tracks the impacts of interventions and remedial measures.

Security analytics engines use both real-time and historical data to detect and diagnose threats. Sources of information include real-time alerts from workstations, servers, sensors, mobile devices, and other endpoints; real-time feeds from other IT security applications (firewalls, intrusion prevention, endpoint detection and response, and other suitable security applications); network traffic volume and types; server logs; and third-party threat intelligence feeds. Security analytics combines data from the various sources and looks for correlations and anomalies within the data.

On the fly policy load/change services periodically download policy and data from servers. The policies and data are loaded on the fly without requiring a restart. Once the policies and data have been loaded, they are enforced immediately. On the fly policy load/change services ensure up-to-date policies and data.

Event processing is a method of tracking and analyzing (e.g., processing) streams of information (e.g., data) about things that happen (events), and deriving a conclusion from them. Complex event processing, or CEP, consists of a set of concepts and techniques for processing real-time events and extracting information from event streams as they arrive. The goal of CEP is to identify meaningful events (such as opportunities or threats) in real-time situations and respond to them as quickly as possible.

A data filter is a computer program or subroutine to process a data stream that produces another data stream. While a single filter is used individually, data filters are frequently strung together to form a pipeline. A data filter, as the name suggests, is used to filter data for desired data elements.

In programming and software design, an event is a change of state (e.g., an action or occurrence) recognized by software, often originating asynchronously from the external environment that is handled by the software. Computer event messages are generated or triggered by a system, by a user, or in other ways based upon the event. Event messages are handled synchronously with the program flow; that is, the software is configured to have one or more dedicated places (e.g., a data sink) where event messages are handled. A source of event messages includes the user, who interacts with the software through the computer's peripherals; for example, by typing on a keyboard. Another source is a hardware device such as a timer. Software is configured to further trigger the software's own set of event messages into the event channel (e.g., to communicate the completion of a task). Software that changes behavior in response to event messages is said to be event-driven, often with the goal of being interactive.

Real-time or real time describes operations in computing or other processes that guarantee response times within a specified time (deadline), usually a relatively short time. A real-time process is generally one that happens in defined time steps of maximum duration and fast enough to affect the environment in which the real-time process occurs, such as inputs to a computing system. In computer science, message queues and mailboxes are software-engineering components typically used for inter-process communication (IPC), or for inter-thread communication within the same process. Message queues use a queue for messaging, the passing of control or of content. In a computer network, downstream refers to data sent from a provider to a consumer. One process sending data primarily in the downstream direction is downloading. In some embodiments, downstream refers to the direction from a shared queue to an event consumer.

FIG. 1 is a block diagram of a correlation and policy engine (CPE) 100, in accordance with some embodiments.

CPE 100 generally includes an event sources input block 102, policy manager block 104, and an action consumer block 106.

Event sources input block 102 includes event emitters (agents, data sources, and other suitable event emitters within embodiments of the present invention). Event emitters detect, gather, and transfer event messages. An event emitter does not know the consumers of the event messages, the event emitter does not even know whether an event consumer exists, and in the event the consumer exists, the event emitter does not know how the event message is used or further processed.

Event sources 102 include events from a cloud network 108. Cloud network computing is on-demand availability of computer system resources, especially data storage (e.g., cloud storage) and computing power, without direct active management by the user. Large clouds often have functions distributed over multiple locations, each location being a data center. Event sources from cloud network 108 are events occurring in the cloud network. In a non-limiting example, one or more incidents occurring within a data center (a building, a dedicated space within a building, or a group of buildings used to house computer systems and associated components, such as telecommunications and storage systems) of cloud network 108.

Event sources 102 include events from a 5G core network (CN) 110. A backbone or CN 110 is a part of a computer network which interconnects networks, providing a path for the exchange of information between different local area networks (LANs) or subnetworks. A CN ties together diverse networks in the same building, in different buildings in a campus environment, or over wide areas. A large corporation that has many locations has a CN that ties the locations together, for example, in response to a server cluster needing to be accessed by different departments of a company that are located at different geographical locations. The pieces of the network connections (for example: ethernet, wireless) that bring these departments together is often referred to as the CN. One example of a CN is the Internet backbone. Event sources from 5G CN 110 are events occurring in the 5G CN. In a non-limiting example, one or more incidents occurring within a server cluster (a set of servers that work together and viewed as a single system where each node is set to perform the same task, controlled, and scheduled by software) of 5G CN 110.

Event sources 102 include events from a 5G radio access network (RAN) network 112. A RAN is part of a mobile telecommunication system. RAN implements a radio access technology. RANs reside between a device such as a mobile phone, a computer, or remotely controlled machines and provides connection with a CN, such as CN 110. Depending on the standard, mobile phones and other wireless connected devices are varyingly known as user equipment (UE), terminal equipment, mobile station (MS), or other suitable equipment within embodiments of the present disclosure. Examples of radio access network types include global system for mobile communications (GSM) radio access network, GSM RAN (GRAN), GERAN (essentially the same as GRAN but specifying the inclusion of EDGE packet radio services), universal mobile telecommunications system (UMTS) RAN, UMTS terrestrial RAN (UTRAN), and E-UTRAN (e.g., long term evolution (LTE) high speed and low latency radio access network). Event sources from 5G RAN 112 are events occurring in the 5G RAN. In a non-limiting example, one or more incidents occurring within terminal equipment and or mobile stations of 5G RAN 112.

Event sources 102 include events from 5G transport networks 114. 5G transport networks 114 include fronthaul and backhaul portions.

The backhaul portion of a network includes the intermediate links between the CN, such as CN 110 and small subnetworks at the edge of a network. The most common network type in which backhaul is implemented is a mobile network. A backhaul of a mobile network, also referred to as mobile-backhaul that connects a cell site to the CN. Two methods of mobile backhaul implementations are fiber-based backhaul and wireless point-to-point backhaul. In both the technical and commercial definitions, backhaul generally refers to the side of the network that communicates with the global Internet. Sometimes middle mile networks exist between the customer's own LAN and those exchanges. In some embodiments, this is a local wide area network (WAN) connection.

A fronthaul network is coincident with the backhaul network, but subtly different. In a cloud RAN (C-RAN) the backhaul data is decoded from the fronthaul network at centralized controllers, from where the backhaul data is then transferred to the CN. The fronthaul portion of a C-RAN includes the intermediate links between the centralized radio controllers and the radio heads (or masts) at the edge of a cellular network. Event sources from 5G transport networks 114 are events occurring in the 5G transport networks 114. In a non-limiting example, one or more incidents occurring within radio controllers or network switches of 5G transport networks 114.

Policy Manager 104 is a real-time CEP engine at scale, which automates various workflows and network healing operations. CPE 100 processes events based on policies. Based upon pre-defined policies and rules policy manager 104 filters the events, enriches the events, correlates, and processes the events for action.

Policy manager 104 includes cleaner 116 that accepts the events from event sources block 102, removes unwanted events, and passes the filtered events to enricher 118 for further processing. In some embodiments, these filtered events are forwarded by using a message-policy cache built by a message-policy sync process. In computing messages are passed between programs or between components of a single program. Message passing is a form of communication used in concurrent and parallel computing, object-oriented programming, and channel communication, where communication is made by sending messages to recipients. A message is sent to an object specifying a request for action.

Policy manager 104 includes enricher 118 which enriches the messages arriving from cleaner 116 with inventory information to successfully execute a policy. In some embodiments, enricher 118 is configured with a message-enrichment cache built by an enricher sync process. In a non-limiting example, received event data is missing fields or parameters. Events are then enriched with the help of an inventory to fill the missing fields and parameters so decisions are made, and predetermined actions occur.

Policy manager 104 includes evaluator 120 that evaluates and processes the enriched events arriving from enricher 118. Evaluator 120 is configured to identify root causes (e.g., what is causing or initiating the received events), decide relevant actions pursuant to predetermined policies, and inform action manager 120 accordingly.

Policy manager 104 includes trigger 122 that matches a policy with an event based the output of evaluator 120 identifying the root causes of the received events. Trigger 122 then forwards the matched policy/event to action consumer 106 to begin an action workflow.

Action consumer 106 includes ticket alert 124. Ticket alert 124 creates an incident creation or a trigger to begin a workflow action.

Action consumer 106 includes trigger workflow 126. In some embodiments, trigger workflow 126 performs actions based on a user-created policy. In some embodiments, trigger workflow 126 initiates the sending of a notification. In some embodiments, trigger workflow 126 initiates a reboot, restart, scale in, scale out, or other suitable actions within embodiments of the present disclosure.

Action consumer 106 includes a notification action 128. In some embodiments, notification action 128 is an email, text message or graphical user interface (GUI) display on a user interface, such as user interface 1218 (FIG. 12) notifying the policy creator and/or network operator an event was received, diagnosed, an action taken, and the result of the action taken (e.g., the action taken was successful or failed).

Figure 2:
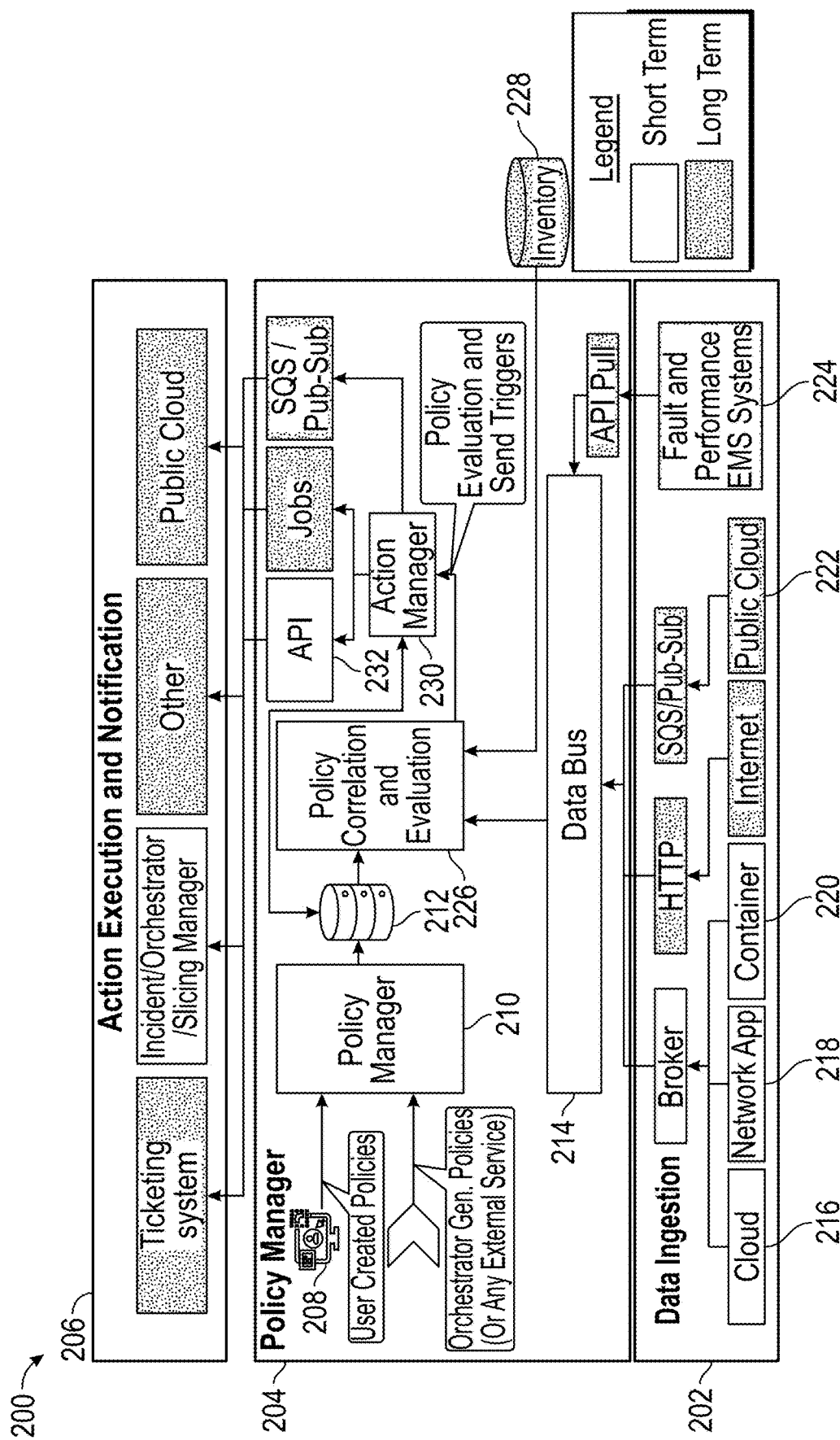
FIG. 2 is a diagrammatic representation a correlation and policy engine (CPE), in accordance with some embodiments.

FIG. 2 is a diagrammatic representation a correlation and policy engine (CPE) 200, in accordance with some embodiments.

In some embodiments, CPE 100 is like CPE 200. In some embodiments, event sources 102 is like data ingestion block 202, policy manager 104 is like policy manager 204, and action consumer 106 is like action manager 230.

Policy Manager 204 is a real-time CEP engine at scale, which automates various workflows and network healing operations (e.g., repair and/or restoration). Policy manager 204 processes events based on predetermined policies and/or rules. Policy manager 204 filters the events, enriches the events, correlates, and processes the events for action. Policy manager 204 provides a framework to support CEP capabilities. In some embodiments, in memory computation logic mitigates latency issues. In some embodiments, multi-source events ingestion covers broader use cases in complex networks and infrastructure. In some embodiments, policy manager 204 is configured with scalable architecture based upon a business requirement (e.g., a new business policy being implemented). In some embodiments, policy manager 204 supports multiple computation logic in near-real time processing, such as event followed by, event AND, event OR, count of event occurrences, and mathematical operations on event counters. In a non-limiting example, the computation logic supports performing an action managed by action manager 230 in response to XYZ event, followed by ABC event, AND (UVW event OR DEF event) along with ten event GHI occurrences. In some embodiments, policy queries are applied on a potentially infinite stream of data. In some embodiments, events are processed immediately. In some embodiments, once policy manager 204 processes all events for a matching sequence, results are driven directly. In some embodiments, this aspect effectively leads to policy manager 204 having a near real-time capability.

Users and/or network operators create policy templates using UI 208. In some embodiments, UI 208 is configured with GUIs that are configured to allow a user to view policy creation templates where the user enters information to create a policy. In some embodiments, UI 208 is like UI 1218. In some embodiments, an orchestrator (orchestration is the automated configuration, coordination, and management of computer systems and software) provides general policies, artificial intelligence (AI) generated policies or policies from any external service. The generated policies are sent to policy manager 210 and policy manager 210 relays the created policies to database 212.

The created policy templates are saved in database 212 as a draft. The policy templates are configured to be validated, activated, de-activated, edited, and deleted. Thus, templates are stored in database 212 until needed and then activated upon command by a user.

Data bus 214 receives data from various sources from data ingestion block 202, such as cloud platform 216, network applications 218, container applications 220, other events through the Internet, events through a public cloud 222, and events through a fault and performance system 224.

In response to received event data at data bus 214 missing fields and/or parameters, these events with missing fields and/or parameters are enriched at policy correlation and evaluation (PCE) module 226 through inventory 228 that provides the missing fields and/or parameters, to make decisions and take predetermined actions. In some embodiments, this is referred to as inventory enrichment.

PCE module 226 logically evaluates and processes the events from data bus 214 based on policies from policy manager 210. PCE 226 is configured to identify root causes of events, determine relevant actions pursuant to the predetermined policies, and inform action manager 230 accordingly of any relevant actions pursuant to the predetermined policies.

Action manager 230 accepts the results after event processing by PCE 226 and takes the corresponding action related to that result. In a non-limiting example, action manager 320 sends an email, sends a request to an API endpoint 232, or other suitable action within embodiments of the present disclosure. Action Manager 230 obtains the status of the executed action and updates the database 212 so that users visualize a job status in UI 208.

Figure 3:
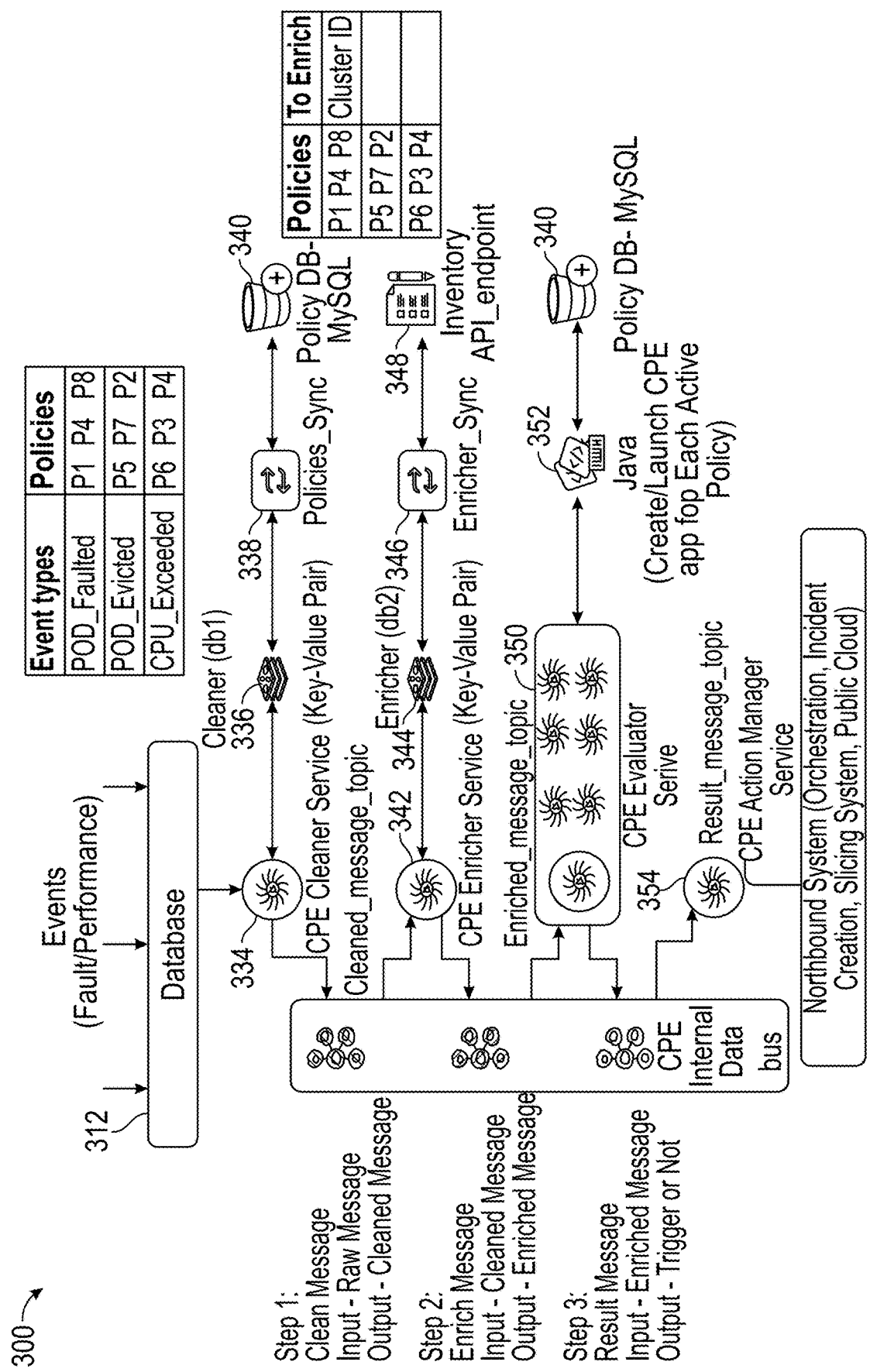
FIG. 3 is a pictorial diagram representation a correlation and policy engine (CPE), in accordance with some embodiments.

FIG. 3 is a pictorial diagram representation a correlation and policy engine (CPE) 300, in accordance with some embodiments.

Figure 4:
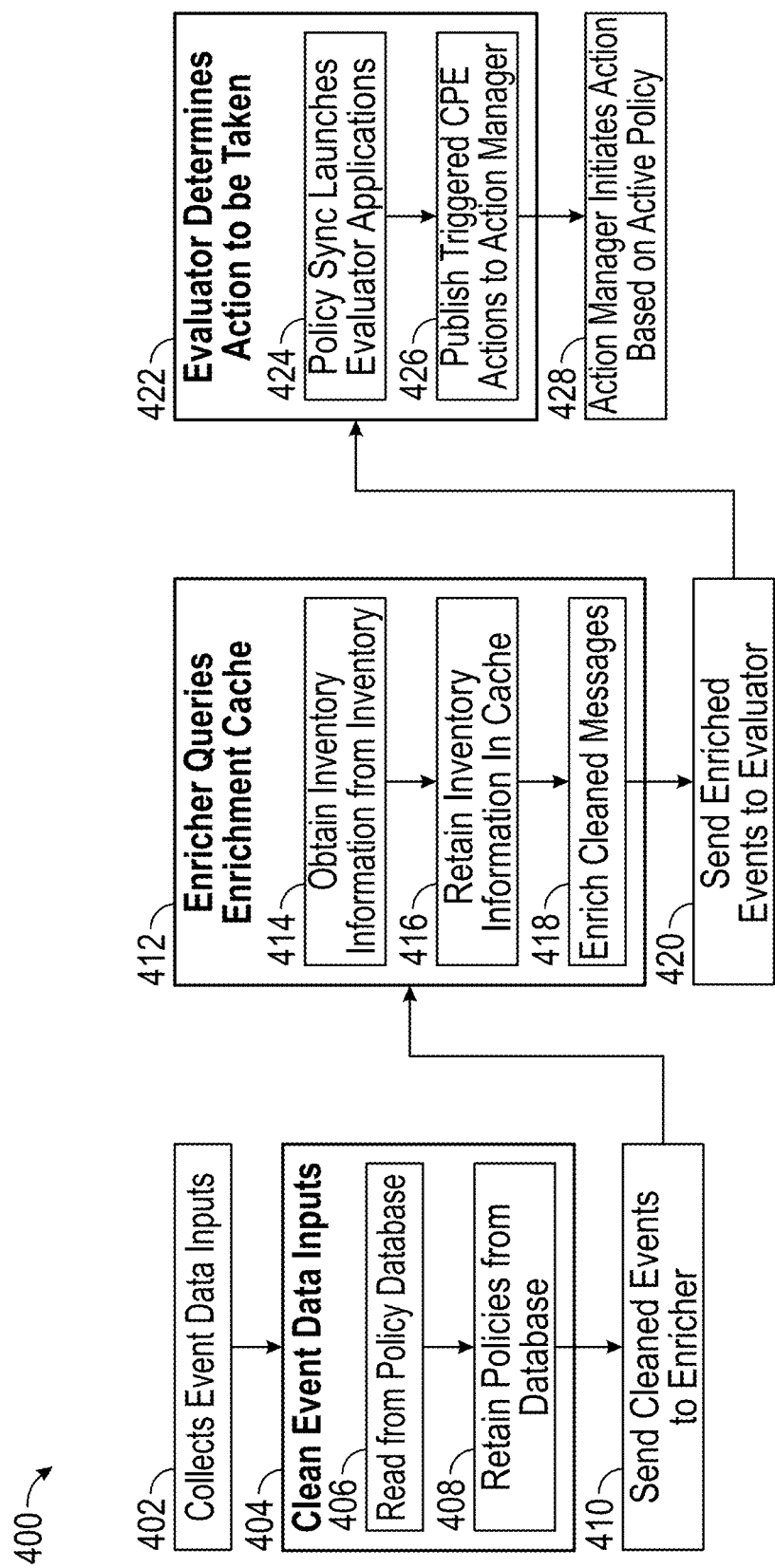
FIG. 4 is a flow diagram of a method for policy correlation and action management, in accordance with some embodiments.

FIG. 4 is a pictorial diagram representation of a method for implementing a correlation and policy engine (CPE) 400, in accordance with some embodiments.

FIGS. 3 and 4 are discussed together to provide an understanding of the operation of CPE 300 through method for implementing a correlation and policy engine (CPE) 400. In some embodiments, method for implementing a CPE 400 is a functional overview of a CPE, such as CPEs 300, 200, or 100. Method 400 is executed by processing circuitry 1202 discussed below with respect to FIG. 12. In some embodiments, some, or all the operations of method 400 are executed in accordance with instructions corresponding to instructions 1206 discussed below with respect to FIG. 12.

Method 400 includes operations 402-428, but the operations are not necessarily performed in the order shown. Operations are added, replaced, order changed, and/or eliminated as appropriate, in accordance with the spirit and scope of disclosed embodiments. In some embodiments, one or more of the operations of method 400 are repeated. In some embodiments, unless specifically stated otherwise, the operations of method 400 are performed in order.

In some embodiments, CPE 300 analyzes, computes, enriches, and evaluates the collected events. In some embodiments, a user creates policy templates through a user interface (UI), such as UI 208 or UI 1218. The created policy filters the collected events, enriches the events (e.g., adds any related event data), correlates the enriched event and then processes the enriched event for action. In some embodiments, created policy templates are saved in a database as a draft where a user validates, activate, de-activate, edit, delete, and other suitable modifications to policy templates within embodiments of the present disclosure. In some embodiments, collected event data is missing parameters and these events are enriched with event data within an inventory so that processing is performed, and actions taken.

A user interface (UI), such as UI 208 or UI 1218, is the space where interactions between humans and machines occur. The goal of this interaction is to allow effective operation and control of the machine from the human end, while the machine simultaneously feeds back information that aids the operators' decision-making process. Non-limiting examples of UIs include the interactive aspects of computer operating systems, hand tools, heavy machinery operator controls, and process controls. UIs are composed of one or more layers, including a human-machine interface (HMI) that interfaces machines with physical input hardware such as keyboards, mice, or game pads, and output hardware such as computer monitors, speakers, and printers. A device that implements an HMI is called a human interface device (HID). Other terms for human-machine interfaces are man-machine interface (MMI) and, when the machine in question is a computer, human-computer interface. Additional UI layers may interact with one or more human senses, including: tactile UI (touch), visual UI (sight), auditory UI (sound), olfactory UI (smell), equilibria UI (balance), and gustatory UI (taste).

A database is a structured collection of data. Databases are anything from a simple shopping list to a picture gallery or a place to hold vast amounts of information in a corporate network. A relational database is a digital store collecting data and organizing the collected data according to a relational model. In this model, tables consist of rows and columns, and relationships between data elements all following a logical structure. A relational database management system (RDBMS) is the set of software tools used to implement, manage, and query such a database.

A cache is a hardware or software component that stores data so that future requests for that data are served faster. The data stored in a cache might be the result of an earlier computation or a copy of data stored elsewhere. A cache hit occurs when the requested data is found in a cache, while a cache miss occurs when it unable to be found. Cache hits are served by reading data from the cache, which is faster than recomputing a result or reading from a slower data store; thus, the more requests that are served from the cache, the faster the system performs.

An action is triggered based upon a matched policy. In some embodiments, a CPE core, such as processing circuitry 1202 of FIG. 12, logically evaluates and processes the collected events. In some embodiments, the CPE core identifies root causes, decides relevant actions pursuant to predetermined policies (discussed above) and instruct an action manager according to the predetermined policies. In some embodiments, the action manager collects the results of event processing and takes a respective action related to the collected result. In a non-limiting example, the action manage sends an email, sends a request to an application programming interface (API) endpoint, and other suitable actions within embodiments of the present disclosure. In some embodiments, the action manager obtains job status feedback to determine the status of the executed job and update a back-end application at the database, so that users determine a status of the job through a UI.

An API is a connection between computers or between computer programs. An API is a type of software interface, offering a service to other pieces of software. An API specification is a document or standard that describes how to build or use such a connection or interface. A computer system that meets this standard is said to implement or expose an API. The term API refers either to the specification or to the implementation. In contrast to a UI, which connects a computer to a person, an application programming interface connects computers or pieces of software to each other. An API is not intended to be used directly by a person (e.g., the end user) other than a computer programmer who is incorporating the API into the software. An API is often made up of different parts which act as tools or services that are available to the programmer. A program or a programmer that uses one of these parts is said to call that portion of the API. The calls that make up the API are also known as subroutines, methods, requests, or endpoints.

Auto healing operation is triggered through CPE 300. In some embodiments, zero-touch network healing is implemented. In a non-limiting example, a user creates a policy through a UI for network healing (e.g., automatic fault resolution). Continuing with the example, in response to a fault event being detected and filtered by CPE 300, the filtered fault activates the user created policy. Continuing with the example, CPE 300 sends enrichment request to an inventory for topology information of the affected network function. Continuing with the example, CPE 300 sends requests to an orchestrator (orchestration is the automated configuration, coordination, and management of computer systems and software) for a network function restart and CPE 300 updates the job status in a CPE UI, such as UI 208 or UI 1218. Continuing with the example, based upon the status of the network function restart, a request is made of CPE 300 to take follow up action. For example, in response to the network function restart failing, then CPE 300 sends a request to the orchestrator for a network re-instantiate (e.g., to create again as an instance of a class). Continuing with the example, the network re-instantiate request is sent to a cloud adapter that relays the status of the network re-instantiate and the CPE updates the job status in the CPE UI.

Thus, the automatic network healing proceeds from fault detection to fault repair, to repair verification, to status update all based upon a user predetermined policy.

Zero-touch provisioning (ZTP) is a method of setting up devices that automatically configures the device using a switch feature. ZTP helps IT teams quickly deploy network devices in a large-scale environment, eliminating most of the manual labor involved with adding them to a network. ZTP is found in devices and tools such as network switches, routers, wireless access points and firewalls. The goal is to enable IT personnel and network operators to install networking devices without manual intervention. Manual configuration takes time and is prone to human error especially with large amounts of devices being configured. ZTP is faster, reduces the chance of error and ensures configuration consistency. Zero-touch provisioning is also used to automate the system updating process. Using scripts, ZTP connects configuration management platforms and other tools for configuration or updates.

Network topology is the arrangement of elements (e.g., links, nodes, and other suitable elements within embodiments of the present disclosure) of a communication network. Network topology is used to define or describe the arrangement of various types of telecommunication networks, including command and control radio networks, industrial fieldbuses, and computer networks. Network topology is the topological structure of a network and is depicted physically or logically. Topology is an application of graph theory wherein communicating devices are modeled as nodes and the connections between the devices are modeled as links or lines between the nodes. Physical topology is the placement of the various components of a network (e.g., device location and cable installation), while logical topology illustrates how data flows within a network.

In operation 402 of method 400, CPE 300 collects near real time performance and event data inputs. In some embodiments, event data inputs are cloud platform events, network application counters, container counters, internet events, public cloud events, fault and performance events or other suitable events within embodiments of the present disclosure. Database 312 accepts events from one or more sources and publishes the events using CPE input messages so that CPE cleaner 334 subscribes to the events and filters the corresponding events. Process flows from operation 402 to operation 404.

In operation 404 of method 400, CPE cleaner 334 filters unwanted events and passes the filtered events for further processing by message-policy cache 336 built by message-policy sync 338. In some embodiments, message-policy cache 336 is a remote dictionary server such as an in-memory data structure store, used as a distributed, in-memory key-value database, cache, and message broker, with optional durability. Message-policy cache 336 supports various types of abstract data structures, such as strings, lists, maps, sets, sorted sets, hyper-logs, bitmaps, streams, and spatial indices. Process flows from operation 404 to operation 406.

In operation 406 of method 400, message-policy sync 338 reads from policy database 340 the active policies in CPE 300 and creates an active policy cache in massage-policy cache 336 such that the policies with the same triggering event type are grouped together. Process flows from operation 406 to operation 408.

In operation 408 of method 400, message-policy cache 336 retains a cache of the policy information provided by message-policy sync 338. Thus, message-policy cache 336 retains real-time current policy information. Process flows from operation 408 to operation 410.

In operation 410 of method 400, CPE cleaner 334 publishes CPE cleaned messages (cleaned or filtered events) to CPE enricher 342. Process flows from operation 410 to operation 412.

In operation 412 of method 400, CPE enricher 342 enriches the cleaned message from CPE cleaner 334 with inventory information (e.g., filling in any missing parameters) to successfully execute a policy, by using message-enrichment cache 344 built by enricher sync 346. Process flows from operation 412 to operation 414.

In operation 414 of method 400, an enricher sync occurs where enricher sync 346 obtains inventory information from a policy-message enrichment database table (a database table in inventory 348 which has information about what inventory information is to be enriched for each message type) and save the information to message-enrichment cache 344. Thus, CPE enricher 342 quickly identifies whether an event needs enriching (i.e., adding missing data to the event). Process flows from operation 414 to operation 416.

In operation 416 of method 400, message-enrichment cache 344 retains a cache of the information provided by enricher sync 346. Process flows from operation 416 to operation 418.

In operation 418 of method 400, message-enrichment cache 344 enriches information (e.g., using the information from inventory 348) for each cleaned message from CPE cleaner 334. Process flows from operation 418 to operation 420.

In operation 420 of method 400, the enriched CPE enriched messages are sent to CPE evaluator 350. Process flows from operation 420 to operation 422.

In operation 422 of method 400, CPE evaluator 350 performs CEP and determines whether an action is to be triggered based upon the enriched message or not. Process flows from operation 422 to operation 424.

In operation 424 of method 400, there is a CPE evaluator 350 created for each active policy template by policy CPE sync 352. Policy CPE sync 352 is the entity which creates and/or launches the one or more CPE Evaluator applications 350 for each active policy. Process flows from operation 424 to operation 426.

In operation 426 of method 400, triggered CPE actions are published by CPE Evaluators 350. CPE action manager 354 is subscribed to the published CPE actions. Process flows from operation 426 to operation 428.

In operation 428 of method 400, CPE action manger 354 initiates the API trigger to trigger an action which based upon the CPE evaluator application 350 (e.g., based on the active policy template).

Figure 5:
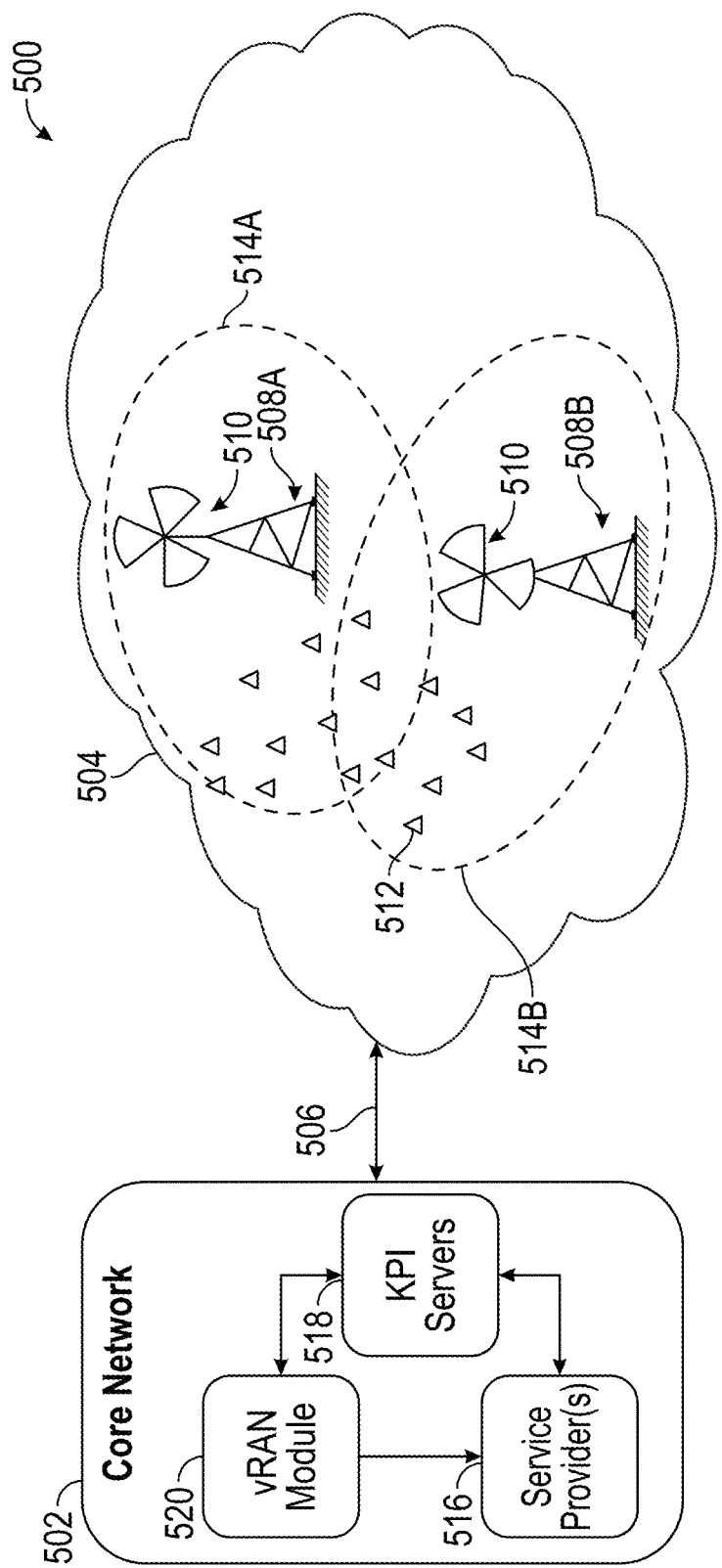
FIG. 5 is a diagrammatic representation of a virtualized Radio Access Network (vRAN) system, in accordance with some embodiments.

FIG. 5 is a diagrammatic representation of a virtualized radio access network (vRAN) system 500, in accordance with some embodiments.

VRAN system 500 includes a CN 502 communicatively connected to RAN 504, through backhaul 506, which is communicatively connected to base stations 508A and 508B (hereinafter base station 508), with antennas 510 that are wirelessly connected to UEs 512 located in geographic coverage cells 514A and 514B (hereinafter geographic coverage cells 514). CN 502 includes one or more service provider(s) 516, KPI servers 518, and vRAN module 520.

In some embodiments, CN 502 is like 5G core network 112 of FIG. 1. CN 502 (also known as a backbone) is a part of a computer network which interconnects networks, providing a path for the exchange of information between different Local Area Networks (LANs) or subnetworks. In some embodiments, CN 502 ties together diverse networks over wide geographic areas, in different buildings in a campus environment, or in the same building.

In some embodiments, RAN 504 is like 5G RAN network 114 of FIG. 1. RAN 504 is a GSM RAN, a GSM/EDGE RAN, a UMTS RAN (UTRAN), an E-UTRAN, Open RAN (O-RAN), virtual RAN (v-Ran), or a Cloud-RAN (C-RAN). RAN 504 resides between user equipment 512 (e.g., mobile phone, a computer, or any remotely controlled machine) and CN 502. RAN 504 is shown as a C-RAN for purposes of simplified representation and discussion In some embodiments, backhaul 506 is like 5G transport network 114 in FIG. 1. In a hierarchical telecommunications network, backhaul 506 of VRAN system 500 comprises the intermediate link(s) between CN 502 and RAN 504. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global internet. The connection between base station 508 and UE 512 begins with backhaul 506 connected to CN 502. In some embodiments, backhaul 506 includes wired, fiber optic and wireless components. Wireless sections include using microwave bands, mesh, and edge network topologies that use a high-capacity wireless channels to get packets to the microwave or fiber links.

In some embodiments, base stations 508 are lattice or self-supported towers, guyed towers, monopole towers, and concealed towers (e.g., towers designed to resemble trees, cacti, water towers, signs, light standards, and other types of structures). Base stations are known by other names such as base transceiver station, mobile phone mast, or cell tower. In some embodiments, base stations are replaced with edge devices configured to wirelessly communicate with UEs. The edge device provides an entry point into service provider CNs, such as CN 502. Examples include routers, routing switches, Integrated Access Devices (IADs), multiplexers, and a variety of Metropolitan Area Network (MAN) and Wide Area Network (WAN) access devices.

In at least one embodiment, antenna(s) 510 are a sector antenna. In some embodiments, antenna 110 operates at microwave or Ultra-High Frequency (UHF) frequencies (300 MHz to 3 GHz). In other examples, antenna(s) 110 are chosen for their size and directional properties. In some embodiments, the antenna(s) 110 are MIMO (Multiple-Input, Multiple-Output) antenna that send and receive greater than one data signal simultaneously over the same radio channel by exploiting multipath propagation.

In some embodiments, UEs 512 are a computer or computing system. Additionally or alternatively, UEs 512 have a Liquid Crystal Display (LCD), Light-Emitting Diode (LED) or Organic Light-Emitting Diode (OLED) screen interface providing a touchscreen interface with digital buttons and keyboard or physical buttons along with a physical keyboard. In some embodiments, UE 512 connects to the Internet and interconnect with other devices. Additionally or alternatively, UE 512 incorporates integrated cameras, the ability to place and receive voice and video telephone calls, video games, and Global Positioning System (GPS) capabilities. Additionally or alternatively, UEs run Operating Systems (OS) that allow third-party apps specialized for capabilities to be installed and run. In some embodiments, UEs 512 are a computer (such as a tablet computer, netbook, digital media player, digital assistant, graphing calculator, handheld game console, handheld Personal Computer (PC), laptop, Mobile Internet Device (MID), Personal Digital Assistant (PDA), pocket calculator, portable medial player, or ultra-mobile PC), a mobile phone (such as a camera phone, feature phone, smartphone, or phablet), a digital camera (such as a digital camcorder, or Digital Still Camera (DSC), Digital Video Camera (DVC), or front-facing camera), a pager, a Personal Navigation Device (PND), a wearable computer (such as a calculator watch, smartwatch, head-mounted display, earphones, or biometric device), or a smart card.

In at least one embodiment, geographic coverage cells 514 are of any shape and size. In some embodiments, geographic coverage cells 514 are a macro-cell (covering 1 Km-30 Km), a micro-cell (covering 200m-2 Km), or a pico-cell (covering 4 m-200 m Service provider(s) 516 are businesses, vendors, or organizations that sell bandwidth or network access by providing direct Internet backbone access to Internet service providers and usually access to its Network Access Points (NAPs). Service providers are sometimes referred to as backbone providers, Internet providers, or vendors. Service providers consist of telecommunications companies, data carriers, wireless communications providers, Internet service providers, and cable television operators offering high-speed Internet access.

KPI servers 118 produce both predictions and live network data. Live-network data (KPIs, UE/cell/MDT (Minimization of Drive Test) traces, and crowdsourced data) allows for modelling of network traffic, hot-spot identification, and radio signal propagation.

vRAN 504 is a type of RAN with its networking functions separated from the hardware running the networking functions. vRAN module 520 provides the control and data planes of vRAN 504 that are also separated as part of the virtualization. vRAN module 520 provides network function virtualization (NFV) which is the practice of turning hardware-based functions into software. In an NFV architecture, the hardware is typically commercial off-the-shelf (COTS) standard hardware. vRAN module 520 adapts to changes in RAN 504 quicker. vRAN module 520 allows change without having to replace hardware throughout the entire infrastructure. vRAN module 520 instead updates software. Upgrading the RAN software improves the network's connectivity, efficiency, or security among other functions.

Figure 6:
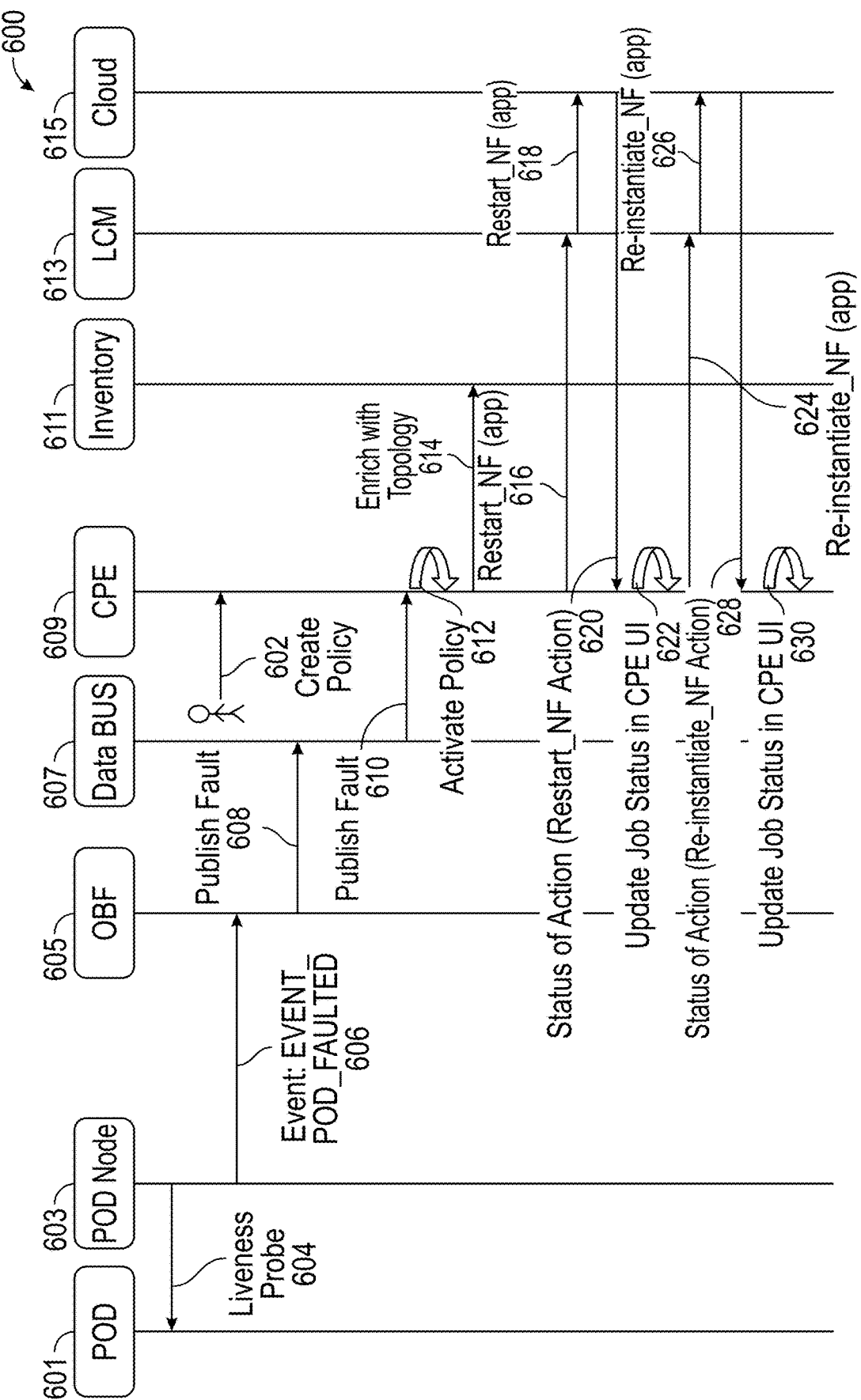
FIGS. 6, 7, 8, 9, 10, and 11 are data flow diagram representations of a method for vRAN software healing, in accordance with some embodiments.

FIG. 6 is a data flow diagram representation of a method for vRAN software healing 600, in accordance with some embodiments.

In some embodiments, method 600 is executed by processing circuitry 1202 discussed below with respect to FIG. 12. In some embodiments, some, or all the operations of method 600 are executed in accordance with instructions corresponding to instructions 1206 discussed below with respect to FIG. 12.

Method 600 includes operations 602-630, but the operations are not necessarily performed in the order shown. Operations are added, replaced, order changed, and/or eliminated as appropriate, in accordance with the spirit and scope of disclosed embodiments. In some embodiments, one or more of the operations of method 600 are repeated. In some embodiments, unless specifically stated otherwise, the operations of method 600 are performed in order.

In operation 602 of method 600, a policy is created in a CPE system, such as CPEs 300, 200, or 100, for vRAN healing. Process flows from operation 602 to operation 604.

In operation 604 of method 600, aggregation nodes (not shown) and container pods 601 are being monitored by liveness probes which are used to know when to restart a container. Aggregate nodes are configured to replace a sequence of input records with summary, aggregated output records. Pods, such as pod 601, are collections of one or more containers that look like real computers from the point of view of the programs running them (e.g., virtual machines). Process flows from operation 604 to operation 606.

In operation 606 of method 600, pod node 603 detects a failure of a pod container, such as pod 601. Pod node 603 attempts to restart the failed pod until all attempts are exhausted, including attempting to restart the pod from a different pod node. In response to one or more pods having trouble restarting, a fault event is created (e.g., EVENT_POD_FAULTED) and is sent to observability framework 605 (OBF) that collects fault events and increments performance counters. Process flows from operation 606 to operation 608.

In operation 608 of method 600, OBF 605 receives the event and sends the event to data bus 607. Process flows from operation 608 to operation 610.

In operation 610 of method 600, data bus 607 sends the fault to CPE 609. In some embodiments, CPE 609 is like CPEs 300, 200, or 100. Process flows from operation 610 to operation 612.

In operation 612 of method 600, CPE 609 filters the fault events and activates policy. CPE 609 filters events based upon existing policy and applies policy condition and rules. Process flows from operation 614 to operation 616.

In operation 614 of method 600, CPE 609 sends an enrichment request to inventory 611 to obtain topology information of the affected network function (NF) and cluster for POD 601. Process flows from operation 614 to operation 616.

In operation 616 of method 600, CPE 609 sends a request to a lifecycle management system 613 (LCM) which is an orchestrator (aligns business requests with the applications, data, and infrastructure) for a NF restart. Process flows from operation 616 to operation 618.

In operation 618 of method 600, LCM 613 sends the NF restart request to cloud adapter 615 (a software utility that controls the transfer of information between local back-office systems and a cloud provider). Process flows from operation 618 to operation 620.

In operation 620 of method 600, cloud adapter 615 and LCM 611 sends the status of the NF restart request to CPE 609. Process flows from operation 620 to operation 622.

In operation 622 of method 600, CPE 609 updates the job status in CPE UI, such as UI 208, and based upon the status of the NF restart request, CPE 609 takes follow up action. Process flows from operation 622 to operation 624.

In operation 624 of method 600, in response to the NF restart failing, then CPE 609 sends a request to LCM 613 for NF to re-instantiate. Process flows from operation 624 to operation 626.

In operation 626 of method 600, LCM 613 sends the NF re-instantiate request to cloud adapter 615. Process flows from operation from operation 626 to operation 628.

In operation 628 of method 600, Cloud Adapter 615 and LCM 613 send the status of the NF re-instantiate to Cpe 609. Process flows from operation 628 to operation 630 where CPE 609 updates the job status in CPE UI.

Figure 7:
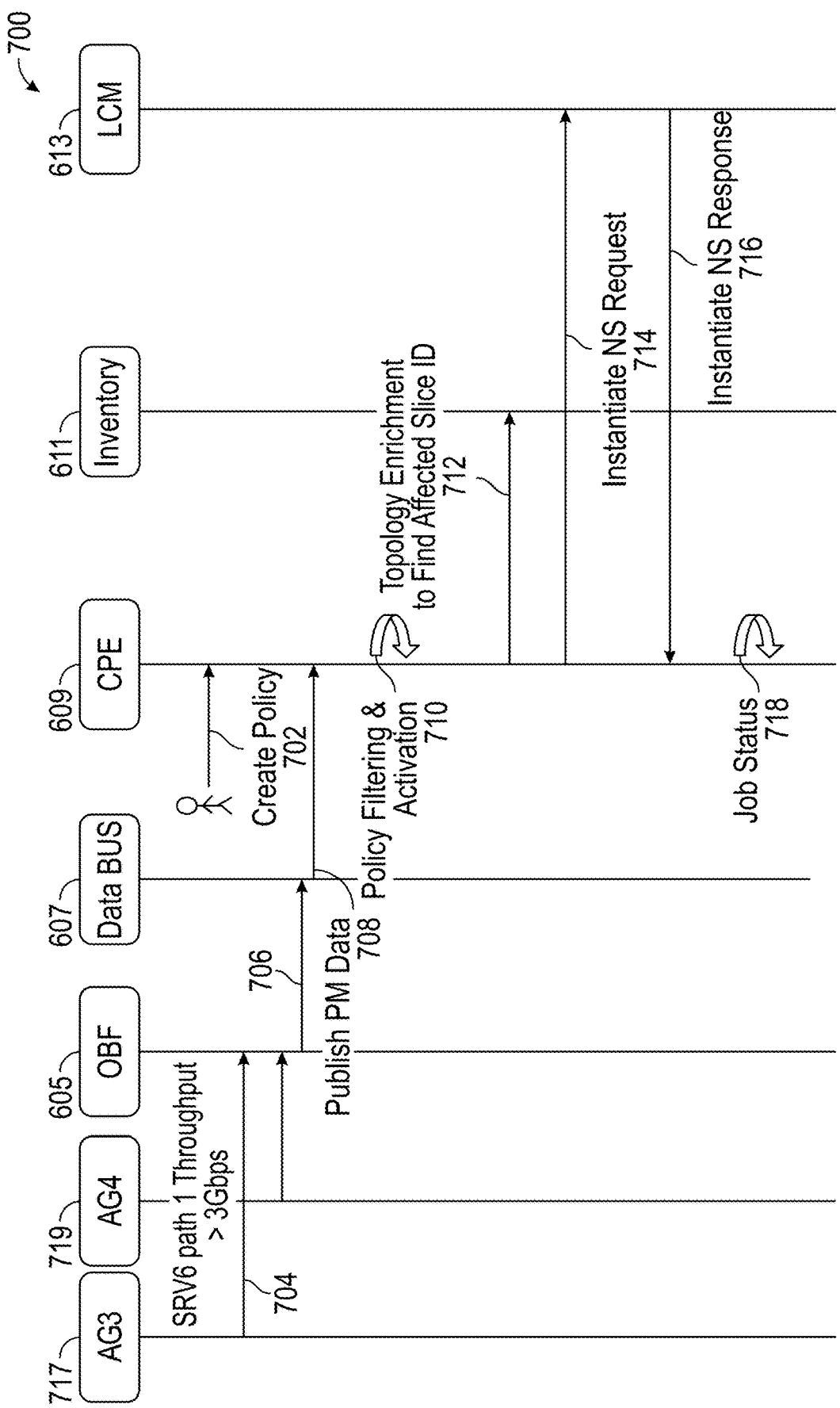

FIG. 7 is a data flow diagram representation of a method for vRAN software healing 700, in accordance with some embodiments.

In some embodiments, method 700 is executed by processing circuitry 1202 discussed below with respect to FIG. 12. In some embodiments, some, or all the operations of method 700 are executed in accordance with instructions corresponding to instructions 1206 discussed below with respect to FIG. 12.

Method 700 includes operations 702-718, but the operations are not necessarily performed in the order shown. Operations are added, replaced, order changed, and/or eliminated as appropriate, in accordance with the spirit and scope of disclosed embodiments. In some embodiments, one or more of the operations of method 700 are repeated. In some embodiments, unless specifically stated otherwise, the operations of method 700 are performed in order.

In operation 702 of method 700, policy is created in CPE system 609. In a non-limiting example, a user creates a polity where in response to segment routing IPv6 (SRV6) path 1 throughput being greater than 3 Gbps, trigger an action for new user plan function (UPF) instance creation. Segment Routing IPv6 (SRv6) is a next-generation IP bearer protocol that combines Segment Routing (SR) and IPv6. Utilizing existing IPv6 forwarding technology, SRv6 implements network programming through flexible IPv6 extension headers. The 5G User Plane Function (UPF) is the function that does the work to connect the data over the RAN to the Internet to route packets quickly and accurately to the correct destination. Thus, in response to throughput being greater than 3 Gbps, a new UPF is created to reduce the throughput burden. Process flows from operation 702 to operation 704.

In operation 704 of method 700, the transport network traffic of aggregation nodes three 717 and four 719 are monitored every thirty seconds at OBF 605 for SRV6 Path 1 throughput. Process flows from operation 704 to operation 706.

In operation 706 of method 700, performance metric (PM) events for SRV6 Path 1 throughput are sent to data bus 607 through OBF 605. Process flows from operation 706 to operation 708.

In operation 708 of method 700, CPE 609 receives the events through data bus 607. Process flows from operation 708 to operation 710.

In operation 710 of method 700, CPE 609 filters the PM events and activates the policy of operation 702 once SRV6 Path 1 throughput is greater than 3 Gbps. Process flows from operation 710 to operation 712.

In operation 712 of method 700, CPE 609 sends an enrichment request to inventory 611 to obtain the topology information of an affected slice identification (e.g., the network slice information). Process flows from operation 712 to operation 714.

In operation 714 of method 700, based upon the enrichment information from inventory 611, CPE 609 raises an action trigger to LCM 613 for creating a new network service instance. Process flows from operation 714 to operation 716.

In operation 716 of method 700, CPE 609 obtains a response from LCM 613 for triggered action status. Process flows from operation 716 to operation 718 where CPE 609 updates the job status in CPE UI.

Figure 8:
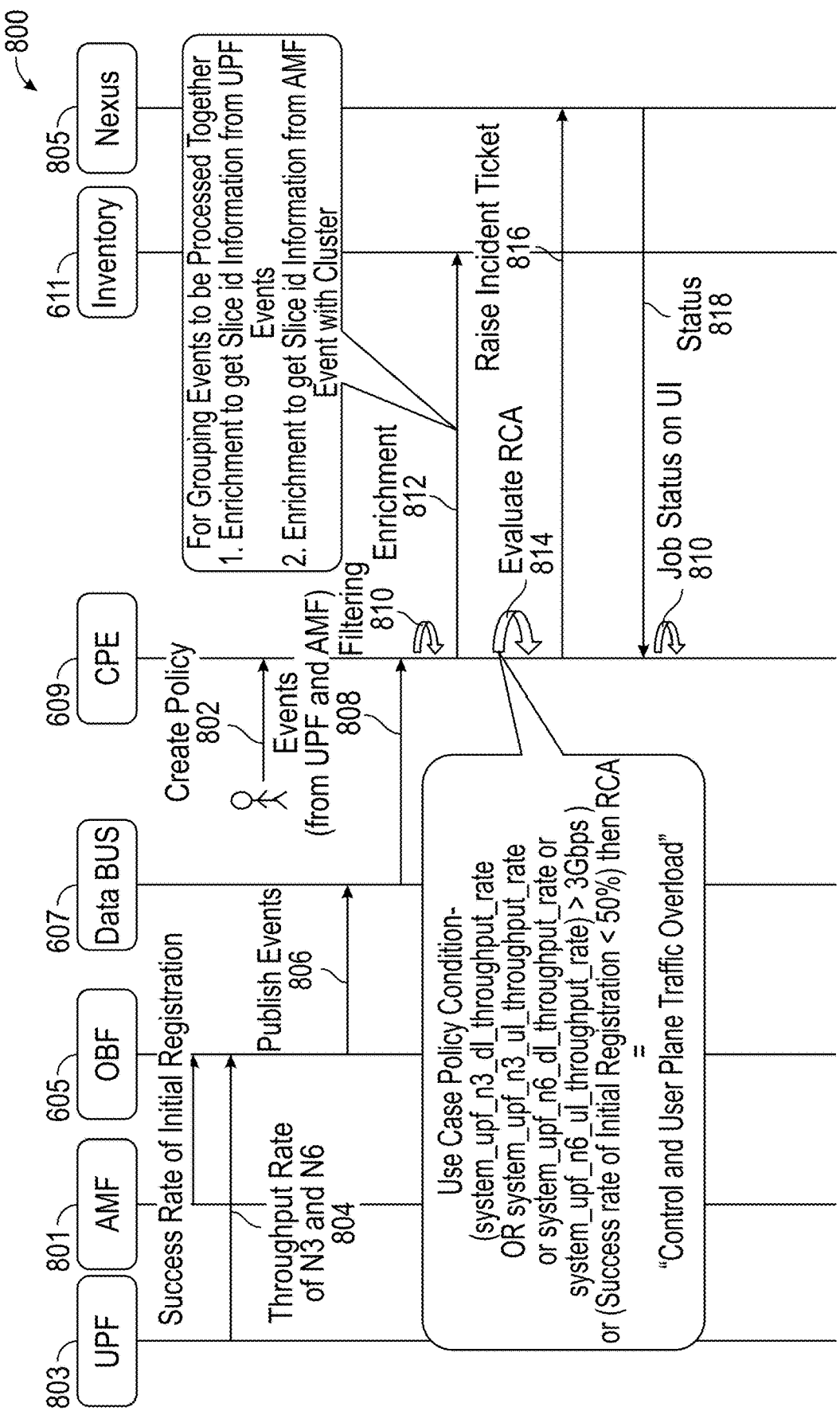

FIG. 8 is a data flow diagram representation of a method for vRAN software healing 800, in accordance with some embodiments.

In some embodiments, method 800 is executed by processing circuitry 1202 discussed below with respect to FIG. 12. In some embodiments, some, or all the operations of method 800 are executed in accordance with instructions corresponding to instructions 1206 discussed below with respect to FIG. 12.

Method 800 includes operations 802-820, but the operations are not necessarily performed in the order shown. Operations are added, replaced, order changed, and/or eliminated as appropriate, in accordance with the spirit and scope of disclosed embodiments. In some embodiments, one or more of the operations of method 800 are repeated. In some embodiments, unless specifically stated otherwise, the operations of method 800 are performed in order.

In operation 802 of method 800, policy is created in CPE system 609. In a non-limiting example, a policy is created in CPE 609 for non-AI assisted root cause analysis (RCA) use case. In a non-limiting example, the policy created monitors the downlink and uplink throughput rate for node 3 and the downlink and uplink throughput rate for node 6. Continuing with the example the policy is set so that in response to either throughput (e.g., dl or ul) for either node 3 or node 6 is greater than 3 Gbps or the success rate of initial registration is less than 50%, then RCA is the control and user plane are overloaded. Process flows from operation 802 to operation 804.

In operation 804 of method 800, events are received at OBF 605 from access & mobility management function (AMF) 801 and 5G user plane function (UPF) 803. AMF is a control plane function in 5G core network, like CN 502. The main functions and responsibilities of AMF are registration management, reachability management, and connection management. UPF is the function that does the work to connect the data coming over the RAN to the Internet quickly and accurately routing packets to the correct destination on the internet. Process flows from operation 804 to operation 806.

In operation 806 of method 800, OBF 605 publishes a fault at data bus 607. Process flows from operation 806 to operation 808.

In operation 808 of method 800, CPE 609 receives the events from data bus 607. Process flows from operation 808 to operation 810.

In operation 810 of method 800, CPE 609 filters the events for based upon available policy. Process flows from operation 810 to operation 812

In operation 812 of method 800, CPE 609 sends an enrichment request to inventory 611 to obtain topology information (e.g., slice ID) of AMF 801 and UPF 803. Process flows from operation 812 to operation 814.

In operation 814 of method 800, CPE 609 evaluates the RCA logic according to policy. Process flows from operation 814 to operation 816.

In operation 816 of method 800, CPE 609 creates an incident ticket and sends the incident ticket to an incident manager system 805. Process flows from operation 816 to operation 818.

In operation 818 of method 800, CPE 609 receives a status update for an incident creation job. Process flows from operation 818 to operation 820 where the job status is updated at CPE UI.

Figure 9:
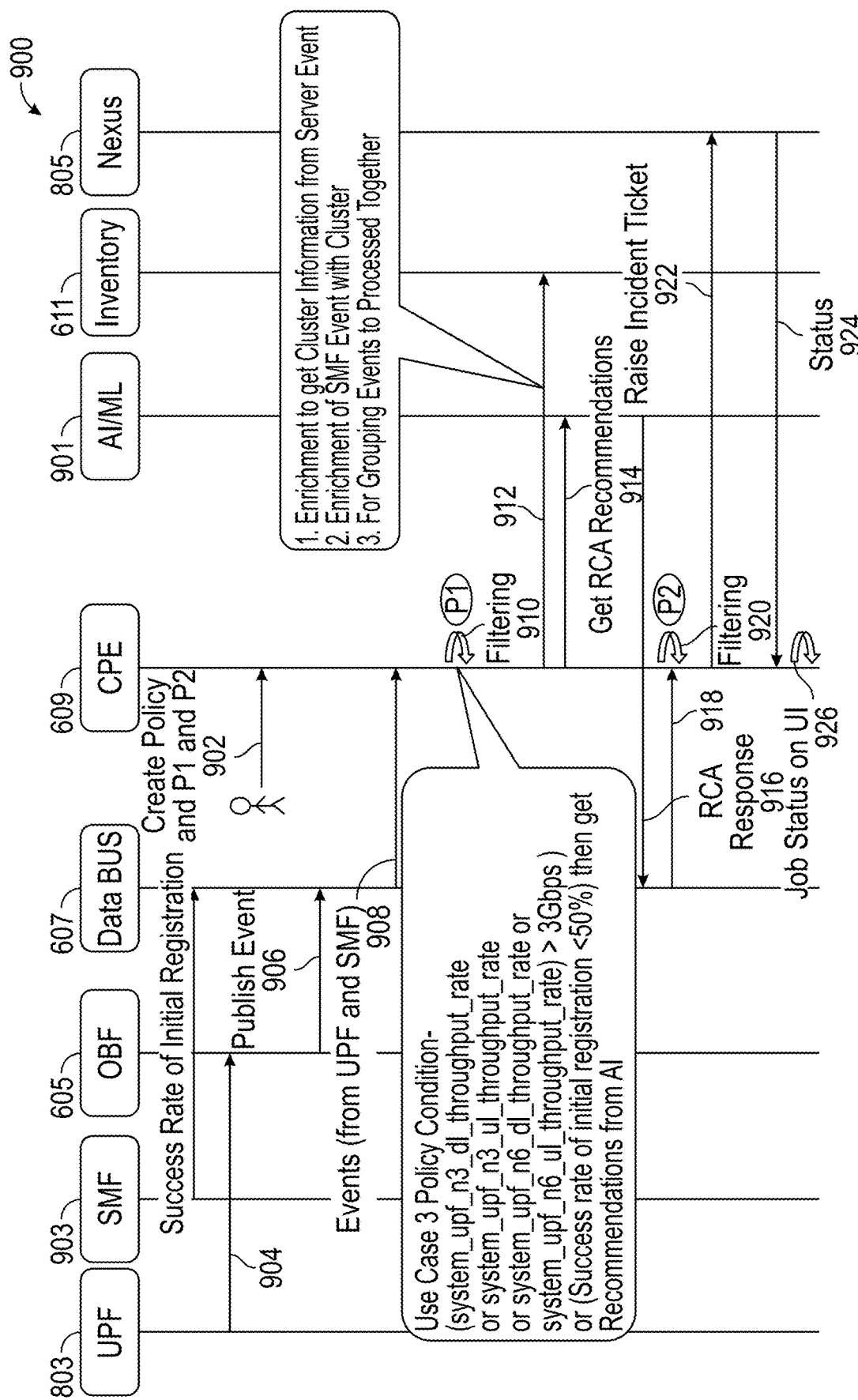

FIG. 9 is a data flow diagram representation of a method for vRAN software healing 900, in accordance with some embodiments.

In some embodiments, method 900 is executed by processing circuitry 1202 discussed below with respect to FIG. 12. In some embodiments, some, or all the operations of method 900 are executed in accordance with instructions corresponding to instructions 1206 discussed below with respect to FIG. 12.

Method 900 includes operations 902-926, but the operations are not necessarily performed in the order shown. Operations are added, replaced, order changed, and/or eliminated as appropriate, in accordance with the spirit and scope of disclosed embodiments. In some embodiments, one or more of the operations of method 900 are repeated. In some embodiments, unless specifically stated otherwise, the operations of method 900 are performed in order.

In operation 902 of method 900, policies are created in CPE system 609. In a non-limiting example, policies P1 and P2 are created. Continuing with the example, P1 policy trigger is based upon OBF events and P2 policy trigger is based upon an RCA response from artificial intelligence/machine learning module (AI/ML) 901. AI/ML module 901 is configured to use computer algorithms that improve automatically through experience and using data. In a non-limiting example, policy 1 created monitors the downlink and uplink throughput rate for node 3 and the downlink and uplink throughput rate for node 6. Continuing with the example the policy is set so that in response to either throughput (e.g., dl or ul) for either node 3 or node 6 is greater than 3 Gbps or the success rate of initial registration is less than 50%, then policy 2 initiates RCA to obtain recommendations from AI/ML 901. Process flows from operation 902 to operation 904. Process flows from operation 902 to operation 904.

In operation 904 of method 900, events are received at OBF 605 from UPF 803 and session management function (SMF) 903. The SMF is responsible for interacting with the decoupled data plane, creating, updating, and removing Protocol Data Unit (PDU) sessions and managing session context with UPF 803. Process flows from operation 904 to operation 906.

In operation 906 of method 900, OBF 605 publishes the fault at data bus 607. Process flows from operation 906 to operation 908.

In operation 908 of method 900, CPE 609 receives the events from respective data bus 607. Process flows from operation 908 to operation 910.

In operation 910 of method 900, CPE 609 filters the events based upon available policy P1. Process flows from operation 910 to operation 912.

In operation 912 of method 900, CPE 609 sends and enrichment request to inventory for obtaining the topology information (e.g., slice ID) of the UPF 803 and SMF 903. Process flows from operation 912 to operation 914.

In operation 914 of method 900, CPE 609 sends a get RCA recommendation action to AI/ML module 901. Process flows from operation 914 to operation 916.

In operation 916 of method 900, AI/ML module 901 sends an RCA recommendation response through data bus 607 to CPE 609. Process flows from operation 916 to operation 918.

In operation 918 of method 900, CPE 609 receives the RCA recommendation response message from data bus 607 and activates policy P2. Process flows from operation 918 to operation 920.

In operation 920 of method 900, CPE 609 implements policy P2 filtering logic. Process flows from operation 920 to operation 922.

In operation 922 of method 900, in response to an action in policy P2, CPE 609 creates an incident ticket to incident manager system 805. Process flows from operation 922 to operation 924.

In operation 924 of method 900, CPE 609 receives the status update for incident creation job and at operation 926 the job status is updated at CPE UI.

Figure 10:
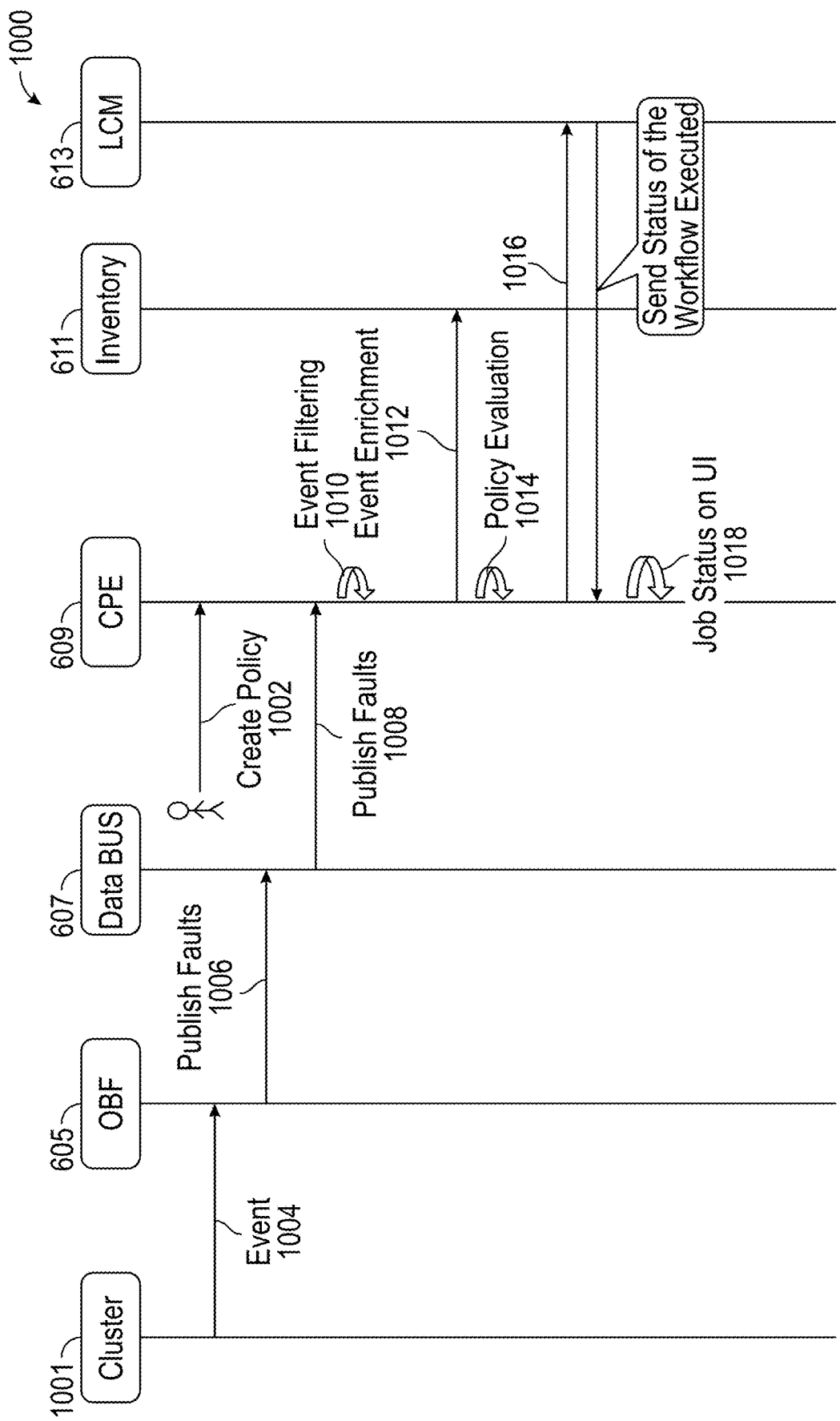

FIG. 10 is a data flow diagram representation of a method for vRAN software healing 1000, in accordance with some embodiments.

In some embodiments, method 1000 is executed by processing circuitry 1202 discussed below with respect to FIG. 12. In some embodiments, some, or all the operations of method 1000 are executed in accordance with instructions corresponding to instructions 1206 discussed below with respect to FIG. 12.

Method 1000 includes operations 1002-1018, but the operations are not necessarily performed in the order shown. Operations are added, replaced, order changed, and/or eliminated as appropriate, in accordance with the spirit and scope of disclosed embodiments. In some embodiments, one or more of the operations of method 1000 are repeated. In some embodiments, unless specifically stated otherwise, the operations of method 1000 are performed in order.

In operation 1002 of method 1000, policies are created in CPE system 609. Process flows from operation 1002 to operation 1004.

In operation 1004 of method 1000, a POD related issue occurs in server cluster 1001 and the event is received by OBF 605. Process flows from operation 1004 to operation 1006.

In operation 1006 of method 1000, OBF 605 publishes the generated event to data bus 607. Process flows from operation 1006 to operation 1008.

In operation 1008 of method 100, data bus 607 publishes the received event to CPE 609. Process flows from operation 1008 to operation 1010.

In operation 1010 of method 1000, CPE 609 filters and analyses events published by OBF 605 to data bus 607. Process flows from operation 1010 to operation 1012.

In operation 1012 of method 1000, CPE 609 sends for enrichment of event information from inventory 611. Process flows from operation 1012 to operation 1014.

In operation 1014 of method 1000, CPE 609 evaluates incoming events based on configured policies. Process flows from operation 1014 to operation 1016.

In operation 1016 of method 1000, CPE 609 invokes LCM 613 to remediate the fault and confirm with LCM 613 upon successful completion of remediation. Process flows from operation 1016 to operation 1018 where the job status is updated in CPE UI.

Figure 11:
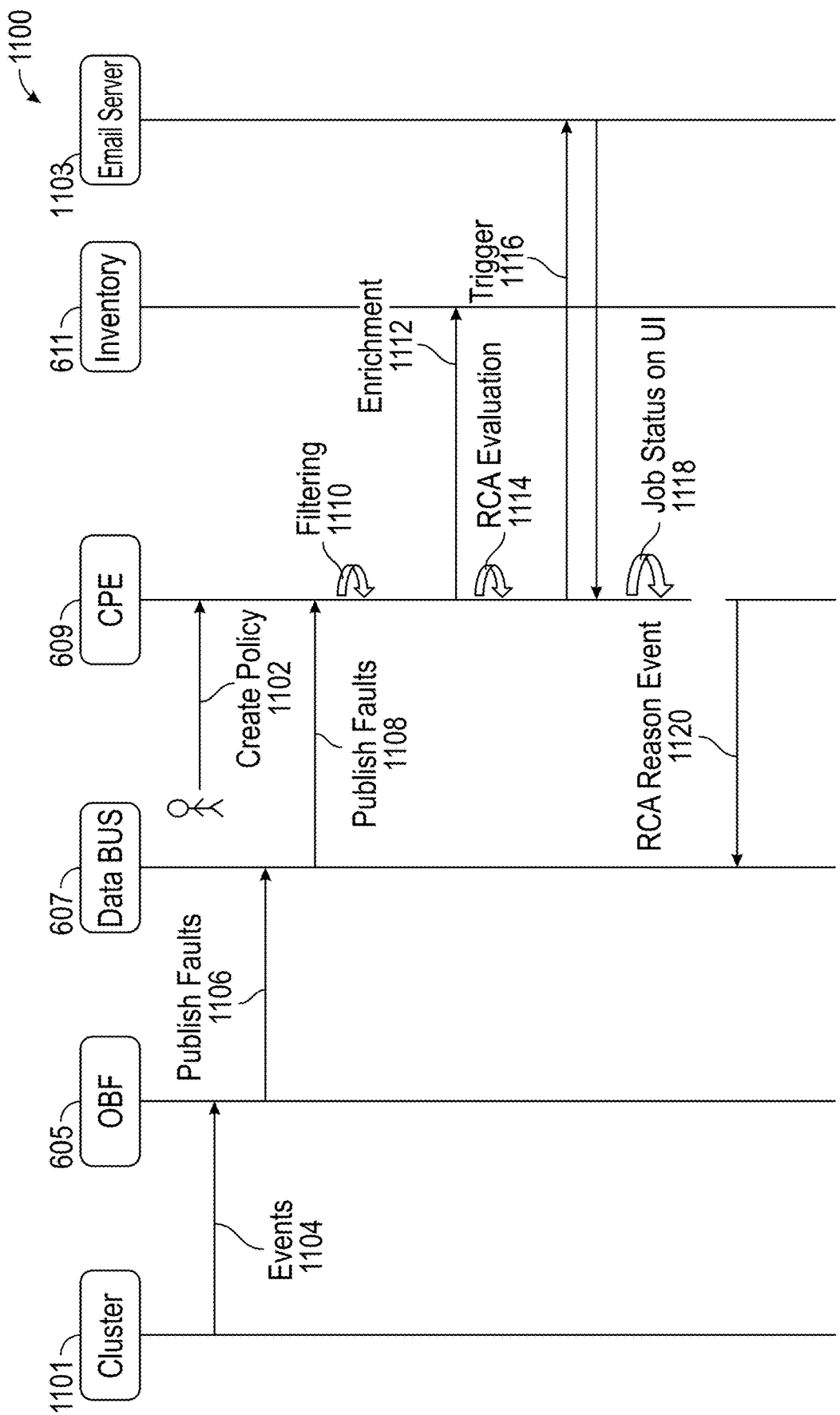

FIG. 11 is a data flow diagram representation of a method for vRAN software healing 1100, in accordance with some embodiments.

In some embodiments, method 1100 is executed by processing circuitry 1202 discussed below with respect to FIG. 12. In some embodiments, some, or all the operations of method 1100 are executed in accordance with instructions corresponding to instructions 1206 discussed below with respect to FIG. 12.

Method 1100 includes operations 1102-1018, but the operations are not necessarily performed in the order shown. Operations are added, replaced, order changed, and/or eliminated as appropriate, in accordance with the spirit and scope of disclosed embodiments. In some embodiments, one or more of the operations of method 1100 are repeated. In some embodiments, unless specifically stated otherwise, the operations of method 1100 are performed in order.

In operation 1102 of method 1100, policies are created in CPE system 609. Process flows from operation 1002 to operation 1004.

In operation 1104 of method 1100, faults occur in a cloud platform cluster 1101 and events are received by OBF 605. Process flows from operation 1104 to operation 1106.

In operation 1106 of method 1100, OBF 605 processes the received events and publishes the generated events to data bus 607. Process flows from operation 1106 to operation 1108.

In operation 1108 of method 1100, data bus 607 publishes the received events to CPE 609. Process flows from operation 1108 to operation 1110.

In operation 1110 of method 1100, CPE 609 filters the events received from data bus 607. Process flows from operation 1110 to operation 1112.

In operation 1112 of method 1100, CPE 609 performs enrichment of event information from inventory 611. Process flows from operation 1112 to operation 1114.

In operation 1114 of method 1100, CPE 609 performs RCA pursuant to the policy (e.g., rule-based RCA). Process flows from operation 1114 to operation 1116.

In operation 1116 of method 1100, CPE 609 sends mail to email server 1103 providing details about the root cause and correlated events. Process flows from operation 1116 to operation 1118 where the job status is updated in CPE UI. Process flows from operation 1118 to operation 1120.

In operation 1120 of method 1100, CPE 609 provides the details about the root cause and correlated events to data bus 607.

Figure 12:
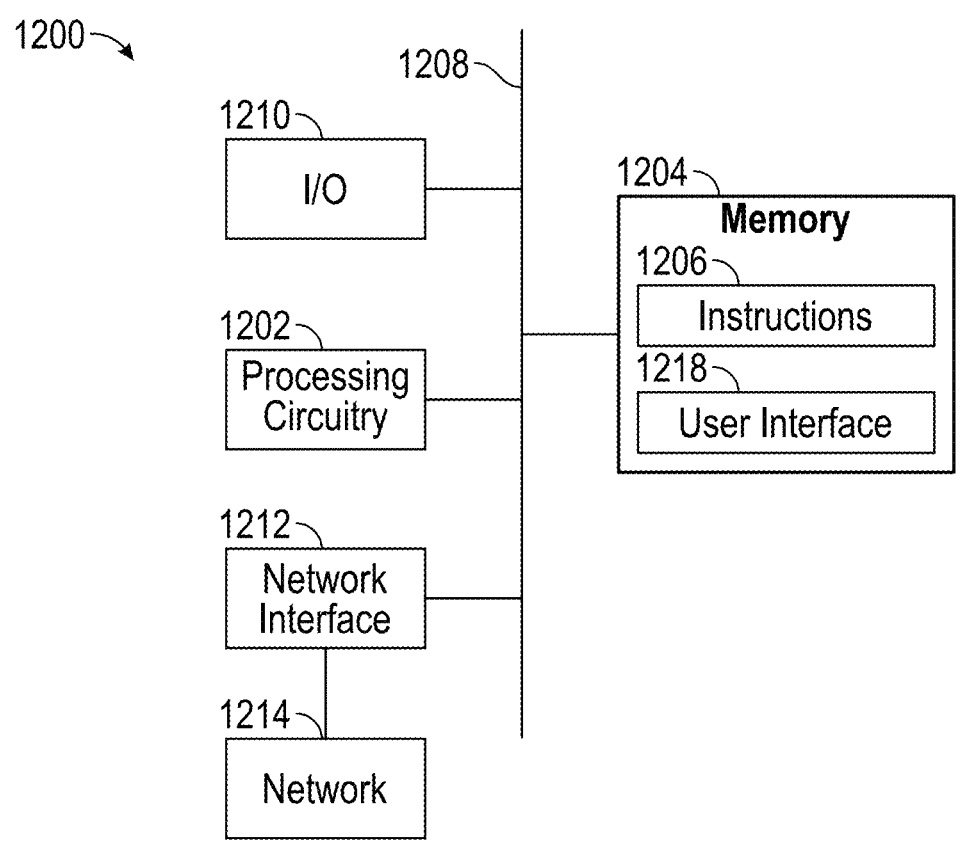
FIG. 12 is a high-level functional block diagram of a correlation and policy processor-based system, in accordance with some embodiments.

FIG. 12 is a block diagram of CPE system 1200 in accordance with some embodiments. In some embodiments, CPE system 1200 is a general-purpose computing device including a hardware processing circuitry 1202 and a non-transitory, computer-readable storage medium 1204. Storage medium 1204, amongst other things, is encoded with, i.e., stores, computer instructions 1206, i.e., a set of executable instructions such as a correlation engine and policy manager. Execution of instructions 1206 by hardware processing circuitry 1202 represents (at least in part) a CPE tool which implements a portion or all the methods, such as method 400, described herein in accordance with one or more embodiments (hereinafter, the noted processes and/or methods).

Hardware processing circuitry 1202 is electrically coupled to a computer-readable storage medium 1204 via a bus 1208. Hardware processing circuitry 1202 is further electrically coupled to an I/O interface 1210 by bus 1208. A network interface 1212 is further electrically connected to processing circuitry 1202 via bus 1208. Network interface 1212 is connected to a network 1214, so that processing circuitry 1202 and computer-readable storage medium 1204 connect to external elements via network 1214. processing circuitry 1202 is configured to execute computer instructions 1206 encoded in computer-readable storage medium 1204 in order to cause CPE system 1200 to be usable for performing the noted processes and/or methods, such as method 400 of FIG. 4. In one or more embodiments, processing circuitry 1202 is a central processing unit (CPU), a multi-processor, a distributed processing system, an application specific integrated circuit (ASIC), and/or a suitable processing unit.

In one or more embodiments, computer-readable storage medium 1204 is an electronic, magnetic, optical, electromagnetic, infrared, and/or a semiconductor system (or apparatus or device). For example, computer-readable storage medium 1204 includes a semiconductor or solid-state memory, a magnetic tape, a removable computer diskette, a random-access memory (RAM), a read-memory (ROM), a rigid magnetic disk, and/or an optical disk. In one or more embodiments using optical disks, computer-readable storage medium 1204 includes a compact disk-read memory (CD-ROM), a compact disk-read/write (CD-R/W), and/or a digital video disc (DVD).

In one or more embodiments, storage medium 1204 stores computer instructions 1206 configured to cause CPE system 1200 to be usable for performing a portion or the noted processes and/or methods. In one or more embodiments, storage medium 1204 further stores information, such as a correlation and policy engine which facilitates performing the noted processes and/or methods.

CPE system 1200 includes I/O interface 1210 that is like UI 208. I/O interface 1210 is coupled to external circuitry. In one or more embodiments, I/O interface 1210 includes a keyboard, keypad, mouse, trackball, trackpad, touchscreen, cursor direction keys and/or other suitable I/O interfaces are within the contemplated scope of the disclosure for communicating information and commands to processing circuitry 1202.

CPE system 1200 further includes network interface 1212 coupled to processing circuitry 1202. Network interface 1212 allows CPE system 1200 to communicate with network 1214, to which one or more other computer systems are connected. Network interface 1212 includes wireless network interfaces such as BLUETOOTH, WIFI, WIMAX, GPRS, or WCDMA; or wired network interfaces such as ETHERNET, USB, or IEEE-864. In one or more embodiments, noted processes and/or methods, is implemented in two or more CPE system 1200.

CPE system 1200 is configured to receive information through I/O interface 1210. The information received through I/O interface 1210 includes one or more of instructions, data, and/or other parameters for processing by processing circuitry 1202. The information is transferred to processing circuitry 1202 via bus 1208. CPE system 1200 is configured to receive information related to a UI through I/O interface 1210. The information is stored in computer-readable medium 1204 as user interface (UI) 318.

In some embodiments, the noted processes and/or methods are implemented as a standalone software application for execution by processing circuitry. In some embodiments, the noted processes and/or methods are implemented as a software application that is a part of an additional software application. In some embodiments, the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a system includes processing circuitry; and a memory connected to the processing circuitry, wherein the memory is configured to store executable instructions that, when executed by the processing circuitry, facilitate performance of operations, including receive a virtualized radio access network (vRAN) policy that includes an event to filter for and response to the event; obtain event messages from a data source, wherein each event message is generated by one or more state changes within a vRAN; filter each event message based on the vRAN policy; enrich filtered event message with information from an inventory; and trigger an action corresponding to the response in the vRAN policy.

In some embodiments, the executable instructions further facilitate performance of operations including perform a root cause analysis (RCA) of the filtered event.

In some embodiments, the executable instructions further facilitate performance of operations including receive a status of the triggered action.

In some embodiments, the executable instructions further facilitate performance of operations including cause a graphical user interface (GUI) to be output by a user interface (UI), the GUI including a display of the status of the triggered action.

In some embodiments, the triggered action is a restart of a network function.

In some embodiments, in response to the restart of the network function failing, the executable instructions further facilitate performance of operations including initiate re-instantiation of the network function.

In some embodiments, the triggered action is to send an incident ticket to an incident manager system.

In some embodiments, the executable instructions further facilitate performance of operations including request RCA recommendation from an artificial intelligence module.

In some embodiments, the executable instructions further facilitate performance of operations including receive the RCA recommendation from the artificial intelligence module.

In some embodiments, a method includes receiving a virtualized radio access network (vRAN) policy that includes an event to filter for and response to the event; obtaining event messages from a data source, wherein each event message is generated by one or more state changes within a vRAN; filtering each event message based on the vRAN policy; enriching a filtered event message with information from an inventory; and triggering an action corresponding to the response in the vRAN policy.

In some embodiments, the method further includes performing a root cause analysis (RCA) of the filtered event.

In some embodiments, the method further includes receiving a status of the triggered action.

In some embodiments, the method further includes causing a graphical user interface (GUI) to be output by a user interface (UI), the GUI including a display of the status of the triggered action.

In some embodiments, the triggering the action corresponding to the response in the vRAN policy includes restarting a network function.

In some embodiments, the triggering the action corresponding to the response in the vRAN policy includes in response to the restarting of the network function failing, initiating re-instantiation of the network function.

In some embodiments, a device including a non-transitory, tangible computer readable storage medium storing a computer program, wherein the computer program contains instructions that when executed, cause the device to perform operations including receive a virtualized radio access network (vRAN) policy that includes an event to filter for and response to the event; obtain event messages from a data source, wherein each event message is generated by one or more state changes within a vRAN; filter each event message based on the vRAN policy; enrich a filtered event message with information from an inventory; and trigger an action corresponding to the response in the vRAN policy.

In some embodiments, the trigger of the action corresponding to the response in the vRAN policy includes initiating re-instantiation of a network function.

In some embodiments, the trigger of the action corresponding to the response in the vRAN policy includes send an incident ticket to an incident manager system.

In some embodiments, the instructions further cause the device to perform operations including request RCA recommendation from an artificial intelligence module.

In some embodiments, the instructions further cause the device to perform operations including receive the RCA recommendation from the artificial intelligence module.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A system, comprising:
   processing circuitry; and
   a memory connected to the processing circuitry, wherein the memory is configured to store executable instructions that, when executed by the processing circuitry, facilitate performance of operations, comprising:
      receive a virtualized radio access network (vRAN) policy that includes an event to filter for and response to the event;
      obtain event messages from a data source, wherein each event message is generated by one or more state changes within a vRAN;
      filter each event message based on the vRAN policy;

enrich a filtered event message having a missing field or parameter value by filling at least one missing field or parameter value of the filtered event message with information from an inventory; and trigger an action corresponding to the response in the vRAN policy based on the enriched filtered event message.

2. The system of claim 1, wherein the executable instructions further facilitate performance of operations, comprising:

perform a root cause analysis (RCA) of the filtered event.

3. The system of claim 1, wherein the executable instructions further facilitate performance of operations, comprising:

receive a status of the triggered action.

4. The system of claim 3, wherein the executable instructions further facilitate performance of operations, comprising:

cause a graphical user interface (GUI) to be output by a user interface (UI), the GUI comprising:
a display of the status of the triggered action.

5. The system of claim 1, wherein the triggered action is a restart of a network function.

6. The system of claim 5, wherein:
in response to the restart of the network function failing, the executable instructions further facilitate performance of operations, comprising:
initiate re-instantiation of the network function.

7. The system of claim 1, wherein the triggered action is to send an incident ticket to an incident manager system.

8. The system of claim 1, wherein the executable instructions further facilitate performance of operations, comprising:

request RCA recommendation from an artificial intelligence module.

9. The system of claim 8, wherein the executable instructions further facilitate performance of operations, comprising:

receive the RCA recommendation from the artificial intelligence module.

10. A method, comprising:
receiving a virtualized radio access network (vRAN) policy that includes an event to filter for and response to the event;
obtaining event messages from a data source, wherein each event message is generated by one or more state changes within a vRAN;
filtering each event message based on the vRAN policy;
enriching a filtered event message having a missing field or parameter value by filling at least one missing field or parameter value of the filtered event message with information from an inventory; and
triggering an action corresponding to the response in the vRAN policy based on the enriched filtered event message.

11. The method of claim 10, further comprising:
performing a root cause analysis (RCA) of the filtered event.

12. The method of claim 10, further comprising:
receiving a status of the triggered action.

13. The method of claim 12, further comprising:
causing a graphical user interface (GUI) to be output by a user interface (UI), the GUI comprising:
a display of the status of the triggered action.

14. The method of claim 10, wherein the triggering the action corresponding to the response in the vRAN policy, comprises:
restarting a network function.

15. The method of claim 14, wherein the triggering the action corresponding to the response in the vRAN policy, comprises:
in response to the restarting of the network function failing, initiating re-instantiation of the network function.

16. A device comprising:
a non-transitory, tangible computer readable storage medium storing a computer program, wherein the computer program contains instructions that when executed, cause the device to perform operations comprising:
receive a virtualized radio access network (vRAN) policy that includes an event to filter for and response to the event;
obtain event messages from a data source, wherein each event message is generated by one or more state changes within a vRAN;
filter each event message based on the vRAN policy;
enrich a filtered event message having a missing field or parameter value by filling at least one missing field or parameter value of the filtered event message with information from an inventory; and
trigger an action corresponding to the response in the vRAN policy based on the enriched filtered event message.

17. The device of claim 16, wherein the trigger of the action corresponding to the response in the vRAN policy, comprises:
initiating re-instantiation of a network function.

18. The device of claim 16, wherein the trigger of the action corresponding to the response in the vRAN policy, comprises:
send an incident ticket to an incident manager system.

19. The device of claim 16, wherein the instructions further cause the device to perform operations comprising:
request RCA recommendation from an artificial intelligence module.

20. The device of claim 19, wherein the instructions further cause the device to perform operations comprising:
receive the RCA recommendation from the artificial intelligence module.

* * * * *